(12) United States Patent
Jobe (10) Patent No.: US 12,168,549 B2
(45) Date of Patent: Dec. 17, 2024

(54) COMPOSTABLE ENVELOPE

(71) Applicant: Vericool World, LLC, San Ramon, CA (US)

(72) Inventor: Darrell Jobe, Pleasanton, CA (US)

(73) Assignee: Vericool World, LLC, San Ramon, CA (US)

( * ) Notice: Subject to any disclaimer, the term of this patent is extended or adjusted under 35 U.S.C. 154(b) by 0 days.

(21) Appl. No.: 18/198,672

(22) Filed: May 17, 2023

(65) Prior Publication Data

US 2024/0132251 A1   Apr. 25, 2024
US 2024/0228117 A9   Jul. 11, 2024

Related U.S. Application Data (63) Continuation of application No. 15/458,811, filed on Mar. 14, 2017, now Pat. No. 11,685,574.

(60) Provisional application No. 62/432,455, filed on Dec. 9, 2016.

(51) Int. Cl.
| | |
|---|---|
| *B65D 27/02* | (2006.01) |
| *B65D 27/14* | (2006.01) |
| *B65D 65/40* | (2006.01) |
| *B65D 65/46* | (2006.01) |
| *B65D 81/03* | (2006.01) |
| *B65D 81/38* | (2006.01) |

(52) U.S. Cl.
CPC ............. *B65D 27/02* (2013.01); *B65D 27/14* (2013.01); *B65D 65/40* (2013.01); *B65D 65/46* (2013.01); *B65D 65/466* (2013.01); *B65D 81/03* (2013.01); *B65D 81/3897* (2013.01); *Y02W 90/10* (2015.05)

(58) Field of Classification Search
CPC ........ B65D 27/02; B65D 27/14; B65D 65/40; B65D 65/46; B65D 65/466; B65D 81/03; B65D 81/3897
See application file for complete search history.

(56) References Cited

U.S. PATENT DOCUMENTS

| | | | |
|---|---|---|---|
| 3,144,188 A | 8/1964 | Gallistel | |
| 3,768,724 A | 10/1973 | Hill | |
| 5,582,674 A | 12/1996 | Patterson | |

(Continued)

FOREIGN PATENT DOCUMENTS

| | | |
|---|---|---|
| CN | 105416797 | 3/2016 |
| DE | 3744621 | 4/1988 |

(Continued)

OTHER PUBLICATIONS

[No author listed], "ASTM D6400:12 Standard Specification for Labeling of Plastics Designed to be Aerobically Composted in Municipal or Industrial Facilities," ASTM International, May 15, 2012, 3 pages.

(Continued)

*Primary Examiner* — Derek J Battisti
(74) *Attorney, Agent, or Firm* — Fish & Richardson P.C.

(57) ABSTRACT

An envelope has front panel and a back panel, the front panel and the back panel joined along three edges and open along a fourth edge to provide an opening to an interior of the envelope. A foldable flap extends from the front panel to close the opening. The front panel, back panel and flap are formed of a compostable plastic film, and the envelope is configured to be entirely compostable as-is by a recipient.

12 Claims, 6 Drawing Sheets

(56) References Cited

U.S. PATENT DOCUMENTS

| | | | |
|---|---|---|---|
| 6,085,909 A | 7/2000 | Lyons | |
| 6,557,325 B1 | 5/2003 | Katz | |
| 6,938,968 B2 | 9/2005 | Tanimoto | |
| 8,763,811 B2 * | 7/2014 | Lantz | B65D 65/466 |
| | | | 206/584 |
| 11,685,574 B2 | 6/2023 | Jobe et al. | |
| 2006/0113360 A1 | 9/2006 | Bartlett | |
| 2008/0099540 A1 | 5/2008 | Mueller | |
| 2008/0289302 A1 | 11/2008 | Vulpitta | |
| 2010/0089990 A1 | 4/2010 | Spaulding | |
| 2011/0100868 A1 | 5/2011 | Lantz | |
| 2011/0114513 A1 | 5/2011 | Miller | |
| 2011/0168770 A1 * | 7/2011 | Ostwald | B65D 27/02 |
| | | | 229/311 |
| 2011/0176749 A1 | 7/2011 | Race | |
| 2011/0229059 A1 | 9/2011 | Hanna et al. | |
| 2012/0279896 A1 | 11/2012 | Lantz | |
| 2012/0285972 A1 | 11/2012 | Fu | |
| 2012/0312814 A1 | 12/2012 | Tollbas-Spurlock | |
| 2014/0117071 A1 | 5/2014 | Kannakeril | |
| 2014/0239052 A1 | 8/2014 | Bugas | |
| 2015/0336730 A1 | 11/2015 | Shields | |
| 2016/0052692 A1 * | 2/2016 | Branham | B32B 5/18 |
| | | | 156/308.2 |
| 2018/0162597 A1 | 6/2018 | Jobe et al. | |

FOREIGN PATENT DOCUMENTS

| | | |
|---|---|---|
| DE | 20 2009 014881 | 4/2010 |
| JP | 10-157741 | 6/1998 |
| JP | 2010-100306 | 5/2010 |
| KR | 10-1068638 | 9/2011 |

OTHER PUBLICATIONS

Extended European Search Report in EP Appln. No. 17879345.1, mailed on Nov. 18, 2019, 12 pages.

International Search Report and Written Opinion in International Application No. PCT/US2017/065406, mailed on Aug. 2, 2018, 15 pages.

Office Action in Chinese Application No. 201780086217.0, mailed on Nov. 12, 2020, 9 pages (with English Translation).

\* cited by examiner

COMPOSTABLE ENVELOPE

CROSS-REFERENCE TO RELATED APPLICATIONS

This application is a continuation of U.S. application Ser. No. 15/458,811, filed Mar. 14, 2017, which claims priority to U.S. Application Ser. No. 62/432,455, filed on Dec. 9, 2016, the entirety of which is incorporated by reference.

TECHNICAL FIELD

This invention relates to an envelope for mailing or shipping a small package, and more particularly to an envelope that is compostable.

BACKGROUND

A conventional envelope is made of paper or cardstock. For mailing a product that should not be bent or folded, e.g., important paper documents, one or more sheets of cardboard can be inserted into the envelope to provide additional stiffness. For mailing a fragile product, sheets of bubble wrap can be inserted into the envelope to protect the product. For mailing of a temperature-sensitive product, sheets of thermally insulating material such as expanded polystyrene (EPS), e.g., Styrofoam, can be inserted into the envelope, and the product placed between the sheets.

SUMMARY

An envelope is described that is compostable "as is" by a recipient, e.g., the entire envelope can simply be deposited in a composting bin without having to be shredded. The envelope can include components for stiffening, cushioning and/or thermal protection while still being compostable "as is".

In one aspect, an envelope has front panel and a back panel, the front panel and the back panel joined along three edges and open along a fourth edge to provide an opening to an interior of the envelope. A foldable flap extends from the front panel to close the opening. The front panel, back panel and flap are formed of a compostable plastic film, and the envelope is configured to be entirely compostable as-is by a recipient.

Implementations may optionally include one or more of the following features.

The front panel, back panel and flap may be formed of a compostable water-proof film. The front panel and back panel may be parts of a single sheet and a first of the three edges may be formed by folding the single sheet. The front panel and the back panel may be joined by a heat seal along a second and a third of the three edges. The envelope may have an adhesive on the flap and a liner covering the adhesive on the flap.

A compostable pad for stiffening, cushioning and/or thermal insulation may be positioned within the envelope. The pad may include a solid compostable panel formed primarily of starch. The starch may include at least one of a grain starch, a root starch or a vegetable starch. The pad may include a plurality of stacked solid compostable panels, each panel of the plurality of formed primarily of starch.

The pad may include a compostable water-proof film forming a pocket enclosing the panel without being bonded to the panel. At least one of the front panel or the back panel of the envelope may provide a wall of the pocket enclosing the panel of the pad.

The pad may include a first solid compostable panel section formed primarily of starch secured to an inner surface of the front panel of the envelope and a second solid compostable panel section formed primarily of starch secured to an inner surface of the back panel of the envelope. The first solid compostable panel section and the second solid compostable panel section may be separate panels. The first solid compostable panel section and the second solid compostable panel section may be sections of a single panel folded at the one of the three edges. The panel may be scored along a line where the panel is folded.

The pad may include a plurality of layers of a compostable film, the plurality of layers including a top layer and bottom layer bonded together in regions that trap air in pockets surrounded by the bonded regions. At least one of the front panel or the back panel of the envelope may provide the bottom layer of the plurality of layers of the pad.

The pad may be secured to an inner surface of at least one of the front panel and back panel of the envelope.

Potential advantages may include (and are not limited to) one or more of the following.

The envelope and any materials used for stiffening, cushioning or thermal protection are compostable, and thus easily disposable in an environmentally friendly manner. The envelope can be manufactured at low cost.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Initially, some terminology may be beneficial. "Biodegradable" simply means that a product will eventually disintegrate into to innocuous material. "Recyclable" indicates that a product can be reused or treated in order to be made suitable for reuse. "Compostable" indicates both that a product will decompose quickly, e.g., within 180 days, and that the product will decompose into material that can be used as fertilizer (e.g., per ASTM D6400 or EN 13432). Products that are "biodegradable" need not be (and usually aren't) "compostable." First, since there is no particular time limit for a "biodegradable" product to disintegrate, it need not decompose quickly. For example, even aluminum cans will biodegrade given several centuries. Moreover, even a biodegradable product that decomposes quickly might not provide a material that is suitable as fertilizer.

Most paper products, e.g., mailing envelopes, are recyclable but are not compostable "as is". While it is possible to shred paper products into bits that are small enough to be compostable, this is inconvenient or impractical for many consumers. As such, an envelope for mailing or shipping that is compostable "as is", i.e., without having to be torn up or shredded, would be environmentally superior.

Similarly, the inserts included in an envelope to provide stiffening, cushioning or thermal protection are not compostable, and sometimes not even recyclable. For example, conventional thermally insulating materials for packaging, e.g., EPS, are not compostable. Similarly, bubble wrap is typically formed of polyethylene (LDPE); even with additives to speed decomposition this material is typically not compostable. Again, providing inserts in an envelope for stiffening, cushioning or thermal protection that are compostable "as is", i.e., without having to be torn up or shredded, would be environmentally superior.

One technique for forming a compostable insulating packaging material is to fill a volume between an inner wall and an outer wall of a box with loose-fill compostable cornstarch foam pellets (e.g., packing "peanuts"), and then compress each layer of foam pellets in within this volume to compact them. This technique requires either multiple boxes or a specialized box. In addition, the loose fill pellets are difficult to compost because they are messy when removed from the box. Moreover, it may be noted that compressed starch pellets would not form a solid part; upon removal of pressure the pellets would disassemble, and increased pressure only fractures or pulverizes the pellets rather than causing them to join into a unitary body.

Instead of paper, an envelope can be formed of a compostable water-proof film. In addition, stiffening or thermal protection can be provided by a solid compostable panel formed primarily of grain starch. In addition, cushioning can be provided by multiple sheets of compostable water-proof film that are bonded together to trap air in pockets. Thus, the envelope and any inserts used for stiffening, cushioning or thermal protection are compostable.

Figure 1A:
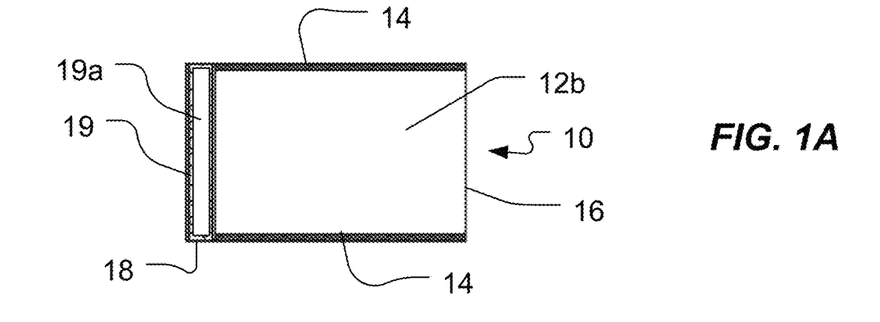
FIG. 1A is a schematic top view and FIG. 1B is a schematic perspective view of an envelope formed of a compostable water-proof film.
Figure 1B:
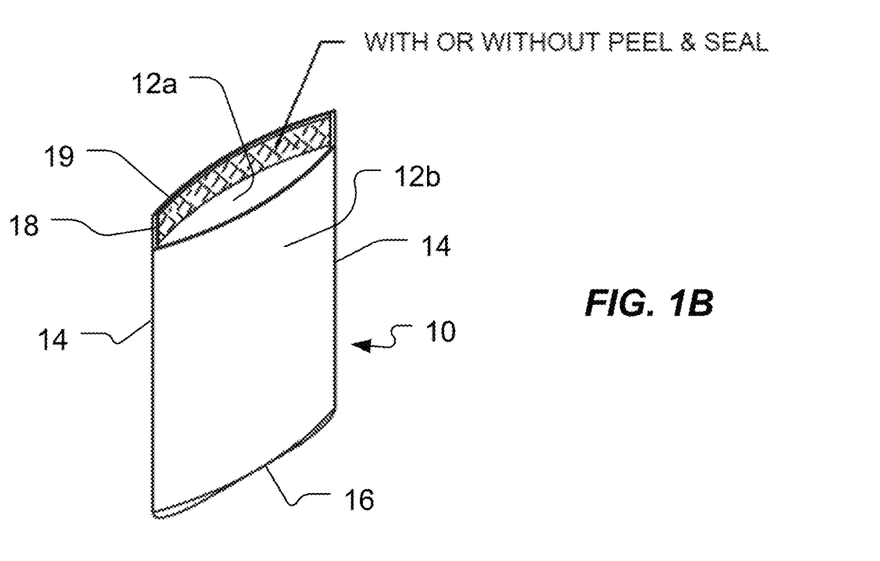

FIGS. 1A and 1B are top and perspective views of a compostable envelope 10. The envelope 10 includes front panel 12a and back panels 12b that are joined along side edges 14 and bottom edge 16, while leaving a top edge open to provide the opening to the interior of the envelope. The envelope can be practically any size suitable for mailing or shipping, e.g., 4"×9", 5.5"×7.5", 8.75"×11.5", etc. In addition, although the envelope (and panels) is shown as rectangular, this is not necessary; the front and back panels could be secured along a more complex paths to provide a different shape.

A portion of the front panel 12a at the top edge can project past the back panel to provide a flap 18 that can be folded over and attached to the back panel 12b to close the envelope 10. Optionally, the interior surface of the flap 18, i.e., the surface that will contact the back panel 12b, can be coated with compostable adhesive layer 19. Moreover, the compostable adhesive layer 19 can be covered by a removable liner 19a to provide a "peel and seal" envelope 10. The liner can also be compostable. However, since the liner 19a would be removed and disposed by the sender, rather than the recipient of the envelope, it need not be compostable for the envelope 10 to be configured to be compostable "as is" by the recipient.

Although the front panel and back panel 12a and 12b are illustrated as the same shape and the flap is illustrated as a simple rectangle of uniform width, many other configurations are possible. For example, a portion of the back panel 12b that will be covered by the flap 18 can be removed, e.g., to provide easier access to the interior of the envelope. In addition, the flap can be a commercial flap, square flap, wallet flap, side seam flap, or baronial flap.

The front panel 12a, back panel 12b and flap 18 are formed of a compostable film. The compostable film can be water-proof. The compostable film can be a plastic film, e.g., a bioplastic, that meets ASTM D6400 standards. In some implementations, the film is substantially air-tight. Suitable materials for the film include polymers based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH). For example, a combination of PBAT and PE may be suitable. As another example, a combination of PE and PLA may be suitable. In some implementations, the polymer can be mixed with an organic product, e.g., a starch, such as corn starch.

The film can have a thickness of 0.7 to 5 mils (thousands of an inch). The stiffness of the envelope is determined by the thickness and density of the film, in conjunction with and any components described below that are bonded to the film. If desired, the envelope formed of the plastic film can be provided with a stiffness comparable to a traditional paper envelope (e.g., can be deformed by manual pressure from a user but stiff enough to retain its shape under gravity if simply held) by appropriate selection of the thickness and material for the film.

Figure 1C:
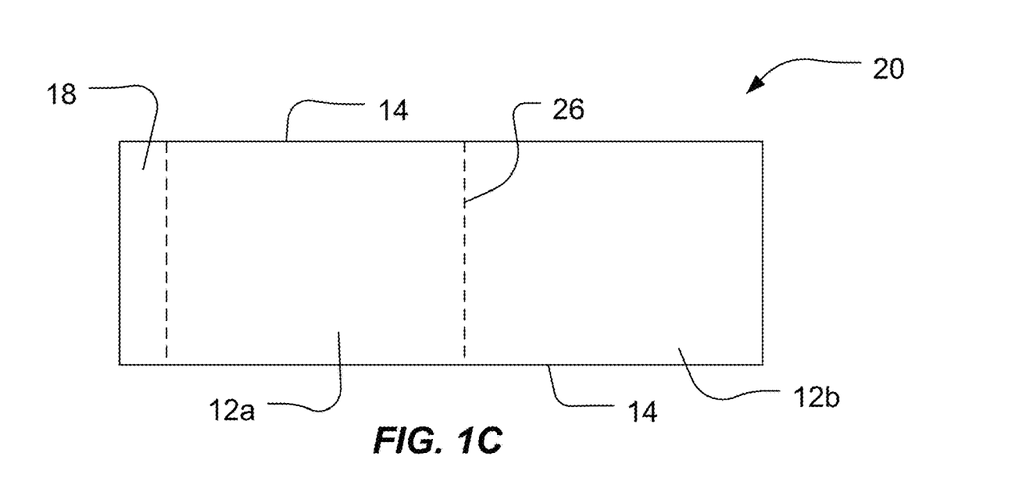
FIG. 1C illustrates assembly of the envelope of FIG. 1A.

Referring to FIG. 1C, one technique to fabricate the envelope is to start with a single sheet 20 of the compostable water-proof film, e.g., fabricated as an individual piece or cut from a larger sheet. The sheet 20 is folded along a line 26 that will provide the bottom edge of the envelope. Then the front panel and back panel are bonded along the two side edges 14 by heat sealing. A suitable sealing temperature is above 100° C. Excess film outside the heat seal can be cut away.

Alternatively, the sheet could be folded along a line that will provide one of the side edges, and the heat sealing could be performed on the bottom edge and side edges. In this case the shape of the sheet 20 would need to be adjusted appropriately to accommodate the flap. Alternatively, the front panel and back panel could be two separate sheets that are bonded along both side edges as well as the bottom edge.

If the adhesive and/or removable liner are to be placed on the flap 18, this can be performed before or after the edges of the front panel and back panel are bonded.

Figure 2:
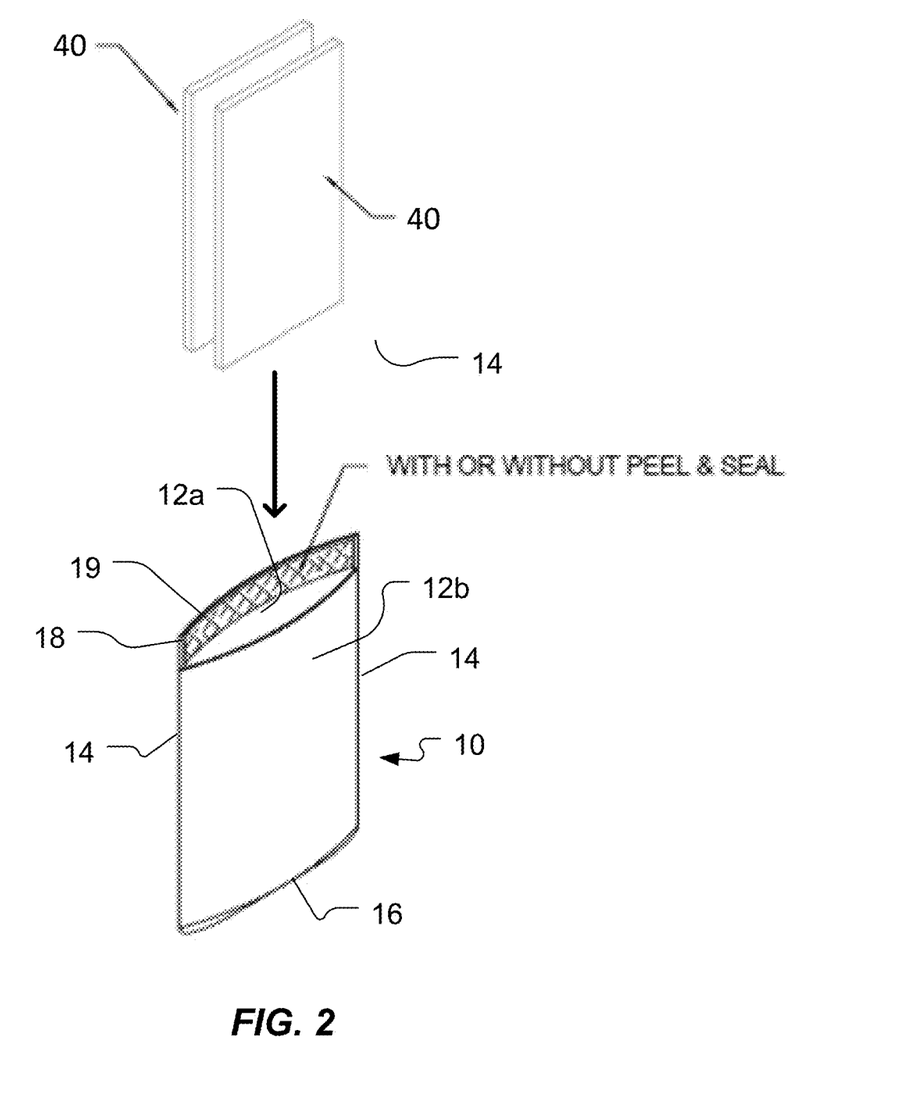
FIG. 2 is a schematic exploded perspective view of an envelope formed of a compostable water-proof film into which pads for cushioning and/or thermal insulation are inserted.

Referring to FIG. 2, one or more compostable pads 40 can be inserted into the envelope 10 to provide cushioning or stiffening, and/or thermal insulation for the contents of the envelope. If there are multiple pads 40, the items to be mailed can be placed between the pads 40.

Each pad 40 can be rectangular and dimensioned to fit within the envelope 10. The thickness of the pad can be between one-sixteenth of an inch to one inch thick, depending on the size of the envelope and the purpose of the pad (e.g., cushioning, stiffening, or thermal insulation). For example, the pad can be one-sixteenth to one-eighth of an inch thick, and/or or one-eighth to one-fourth of an inch thick, and/or one-fourth to one-half an inch thick.

Figure 3:
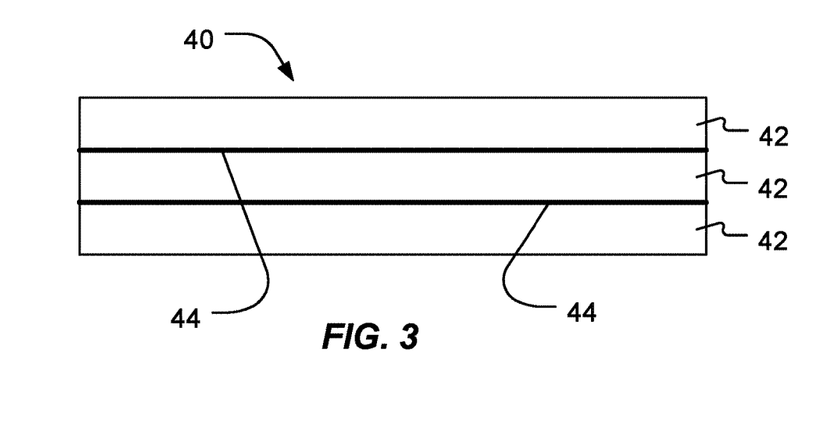
FIG. 3 is a schematic cross-sectional side view of a multiple panels stacked to forma pad.
Figure 4:
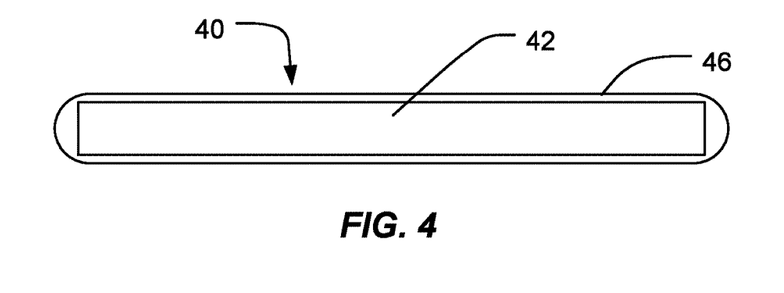
FIG. 4 is a schematic cross-sectional side view of a panel placed inside a water-proof film to form a pad.

Each pad 40 includes one or more solid compostable panels 42 (see FIGS. 3 and 4). In some implementations, the pad includes a single panel.

Each panel 42 can be formed primarily of starch, e.g., an extruded starch. The starch can be a grain starch, e.g., corn starch, wheat starch or sorghum (sorghum is also known as milo), a root starch, e.g., potato starch, a vegetable starch, or combinations thereof. Other materials that do not interfere with the compostable nature of the panel, e.g., a softener to improve adhesion of the starch, a preservative or anti-fungal agent, can be present, but only in small quantities. For example, at least 85%, e.g., at least 90-95%, by weight of the panel is starch. Polyvinyl alcohol can be present, e.g., 5-10% by weight.

Each panel 42 is "solid", which in this context indicates that the panel holds together as a single unit, rather than being formed of loose-fill pellets. It may be noted that compressed starch pellets would not form a solid part; upon removal of pressure the pellets would disassemble, and increased pressure only fractures or pulverizes the pellets. A solid panel of extruded milled sorghum provides significant thermal insulation, while still being compostable.

It is possible for the panel 42 to be a foam material, e.g., to include small pores or voids spread substantially uniformly through the panel. For example, 10-80% of the volume of the panel can be pores or voids, e.g., 25-75%, 25-50%, 10-25%, 50-75%. The maximum size of the pores or voids can be about 1 mm. The density of a panel can be about 0.4-4.5 g/cm$^3$, e.g., 0.6-1.0 g/cm$^3$, 0.8-2.0 g/cm$^3$, 1.0-3.5 g/cm$^3$.

Each panel 42 can be of a uniform homogenous composition. Furthermore, each panel 42 can be a unitary body—that is the body of the panel holds together by itself without adhesives or fasteners to join multiple sections together to form the panel.

The panel 42 can have substantially uniform thickness across its primary surface. The surfaces of the panel 42 can be generally flat, or one or more surfaces can be corrugated. Corrugation can increase the effective thickness of the pad, e.g., by a factor of up to 4. In this case, the thickness of the panel 42 can still be uniform, but the panel is shaped with corrugations.

A panel can be formed by an extrusion process. After extrusion, each panel can be cut to the appropriate size. In addition, the edges can optionally be beveled.

As shown in FIG. 3, in some implementations, the pad 40 includes multiple panels 42 that are stacked. Adjacent panels 42 can be joined by an adhesive layer 44.

As shown in FIG. 4, the pad 40 can optionally also include a compostable water-proof film 46 that encloses the panel 42 to protect the panel 42 from moisture. The film 46 can be a plastic film, e.g., a bioplastic, that meets ASTM D6400 standards, e.g., as described above for the envelope 10. Although FIG. 4 illustrates a single panel 42, there could be multiple panels 42 enclosed in the film 46, and the panels could be joined as shown in FIG. 3 or left as separate pieces. The panel 42 can sit loose inside the pocket formed by the film 46, or the film 46 can be bonded onto the panel 42.

To fabricate a pad 40, the solid compostable panel 42 can be placed between two sheets of the water-proof film 46. The edges of the water-proof film 46 can be heat-sealed to each other, e.g., along the entire perimeter of the panel, thus enclosing and sealing the panel 42 in a pocket of the compostable water-proof film that has only slightly larger dimension than the panel itself. A suitable sealing temperature is above 100° C. Excess film outside the heat seal can be cut away.

Figure 5:
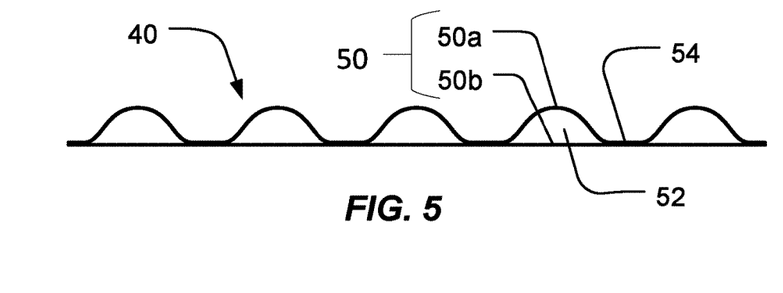
FIG. 5 is a schematic cross-sectional side view of a pad with a plurality of layers bonded together in regions that trap air in pockets.

Alternatively, as shown in FIG. 5, instead of a solid compostable panel 42, the pad can be formed by a plurality of layers of compostable film 50 that are bonded together and trap air bubbles. This can provide a compressible pad similar to "bubble wrap", but formed completely of compostable material.

In particular, the pad 40 can include a top layer 50a and a bottom layer 50b of compostable film. The top layer 50a and bottom layer 50b are bonded together in regions 54 that trap air in pockets 52 surrounded by the bonded regions 54. The pockets can be arranged, for example, in a hexagonal closest packed pattern. In some implementations, the bottom layer 50b is substantially flat, and the top layer 50a is shaped to define the pockets 52. The bottom layer 50b can be thicker and/or less flexible than the top layer 50a.

The layers of compostable film 50 can be a plastic film, e.g., a bioplastic, that meets ASTM D6400 standards, e.g., as described above for the envelope 10. However, the layers of compostable film 50 can be thinner and/or more flexible than the compostable film of the envelope 10. Flexibility of the plastic film can be adjusted by composition of the plastic, density of the plastic (e.g., porosity), and by the degree of curing.

This pad 40 can be fabricated by starting with two separate pieces of film. A first film that will provide the top layer 50a is suctioned against a surface patterned with the complement of the shape of the pockets. A second film that will provide bottom layer 50b can be placed adjacent to the top layer 50a, thus trapping air in the pockets. Then the area in which the first and second films contact each other can be heat sealed to provide the bonded regions 54.

Figure 6:
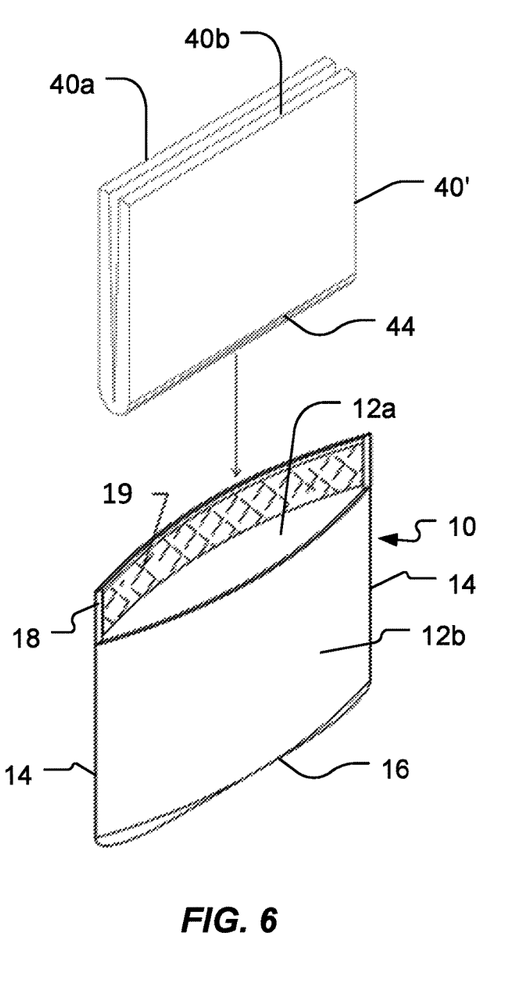
FIG. 6 is a schematic exploded perspective view of an envelope formed of a compostable water-proof film with a folded pad.

Referring to FIG. 6, rather than multiple pads, a single large pad 40' could be folded over to provide two parallel pad sections 40a and 40b connected along an edge 48, and inserted into the envelope 10. The folded edge 48 of the pad 40' can be adjacent the bottom edge 16 of the envelope 10 or along one of the side edges 14.

The panel 42 of the pad 40' can optionally be pre-scored across its width in the position that will provide the edge 48. The score can create a recess that extends partially, but not entirely through the thickness of the panel 42. The score can be formed by compression or cutting of the panel 42.

As a cushion, the pad 40 should be somewhat compressible. In particular, the pad should be more compressible than the panels of the envelope 10. In this case, the pad could include the panel 42 or the layers of compostable film 50 that trap air in pockets. This implementation is useful for mailing or shipping of items that are fragile.

As a reinforcement to stiffen the envelope, the pad 40 should be less flexible than the material of the envelope. In this case, the pad should include the panel 42. This implementation is useful for mailing or shipping of items, e.g., documents, that should not be folded or bent.

As a thermal insulator, the pad 40 could be more or less flexible than the envelope 10. However, to provide insulation, the pad should include the solid starch panel 42. A starch-based panel should provide sufficient thermal insulation for many applications. When the thermally insulating pads 40 are positioned in the envelope 10, they provide an interior space to receive the item and optionally a coolant, e.g., a gel pack.

However, a problem with starch-based insulation is that it dissolves easily in water. If the item being shipped or mailed is cold or a coolant is placed in the interior of the envelope 10, condensation can form inside the envelope 10. However, the film 46 prevents liquid, e.g., the condensation, from reaching the solid starch panel 42, thus enabling the starch panel to be usable as a thermal insulator in the envelope 10.

Figure 7A:
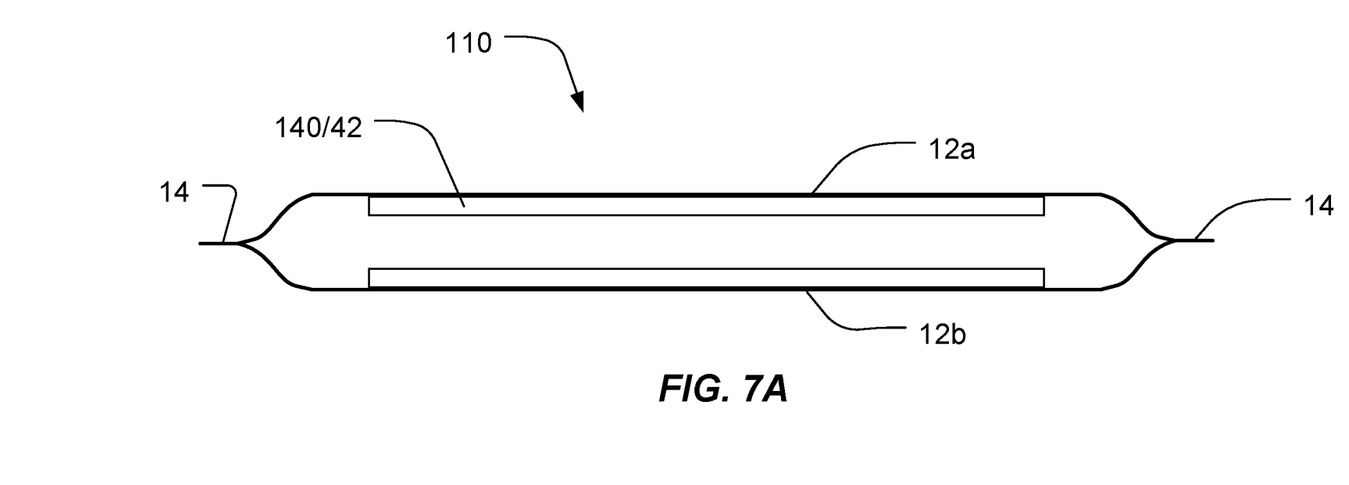
FIGS. 7A and 7B are schematic cross-sectional side view of an envelope in which a pad is secured to an inner surface of the envelope.
Figure 7B:
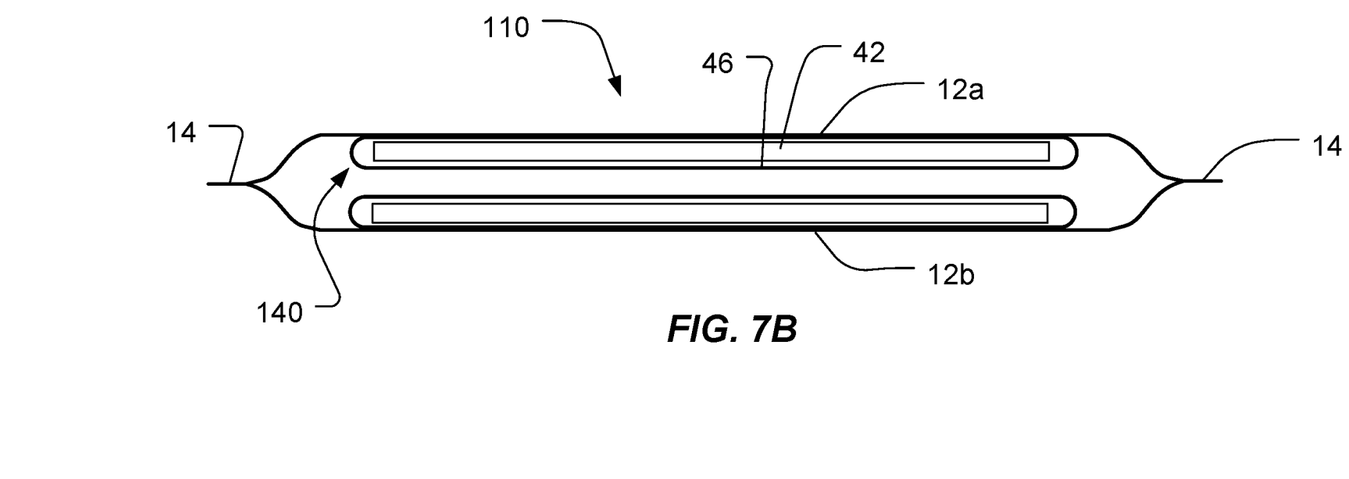

Referring to FIGS. 7A and 7B, an envelope 110 can be fabricated that has a compostable pad 140 bonded to the inside of the envelope 110 to provide cushioning and/or thermal insulation. Except as discussed below, the envelope 110 can include the various features and be constructed as described for envelope 10, and the pad 140 can include the various features and be constructed as described for pad 40. Where the pad 140 includes just the panel 42, it is the panel 42 that would be secured to the sheet 120 (see FIG. 7A). Where the pad 140 includes a panel 42 surrounded by a water-proof film 46, the film 46 would be secured to the sheet 120 (see FIG. 7B).

Figure 8A:
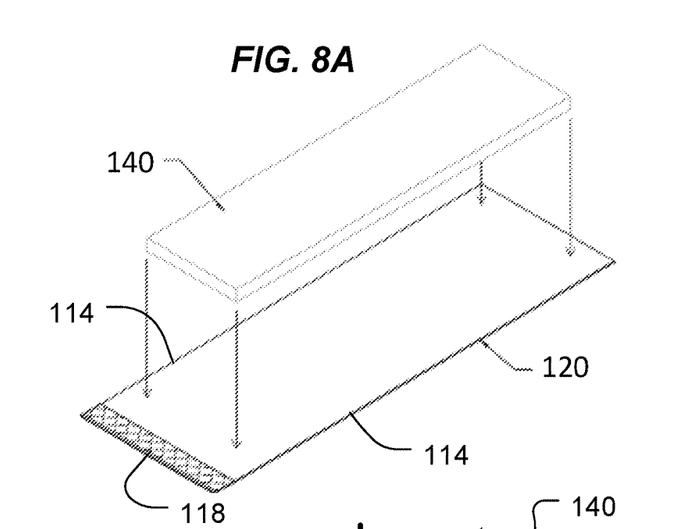
FIGS. 8A-8D are schematic perspective views of forming of a compostable envelope onto which a pad for cushioning and/or thermal insulation is secured.

Referring to FIG. 8A, a pad 140 is placed onto a sheet 120 of the compostable water-proof film. The sheet 120 can otherwise be formed as described for sheet 20. The pad 140 is secured to the sheet 120, e.g., by heat sealing or by a layer of compostable adhesive. The pad 140 is narrower than the sheet 120, to provide room for later bonding of the sheet 120 along the edges to form the envelope 110.

Figure 8B:
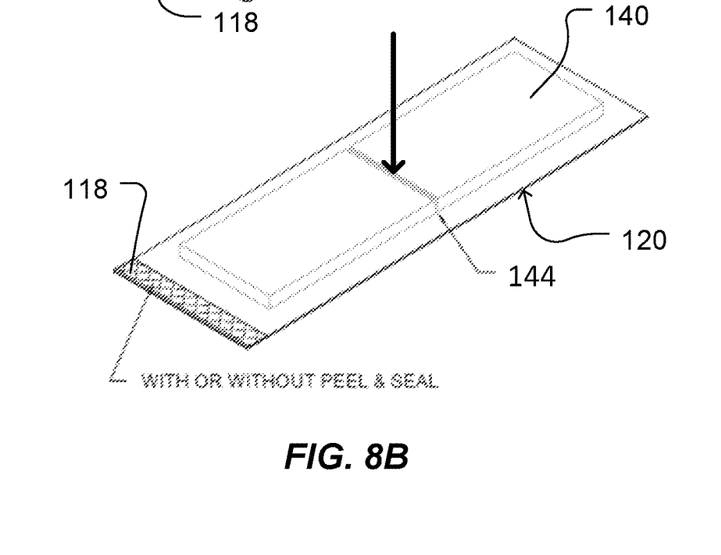

Referring to FIG. 8B, optionally the pad 140 is scored, e.g., along a line 144 extending across a width of the pad 140. The pad 140 can be scored by cutting, e.g., of the panel, or compression.

Figure 8C:
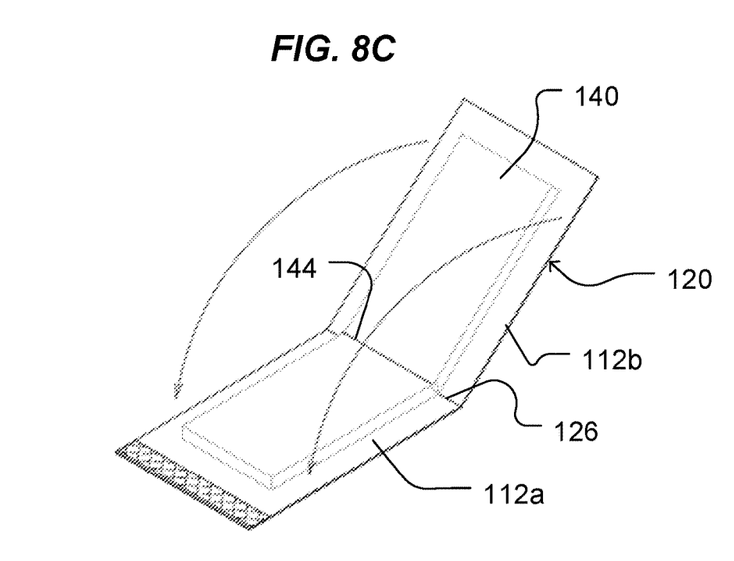

Referring to FIG. 8C, the combination of the sheet 120 and the pad 140 is then folded, e.g., along the score 142 if present. This provides the front panel 112a and back panel 112b of the envelope 110. The line 126 along which the sheet 120 is folded thus provides one edge, e.g., the bottom edge 116, of the envelope 110. The folding is performed such that the pad 140 is positioned on the interior surface (i.e., on the inside of the envelope) of the front panel 112a and back panel 112b.

Figure 8D:
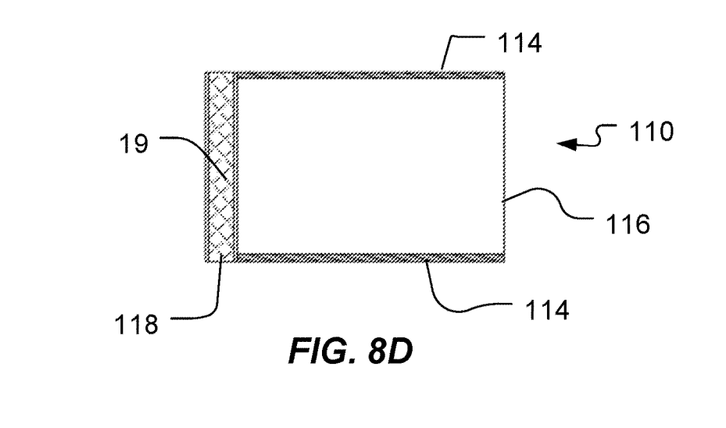

Referring to FIG. 8D, the front panel 112a and the back panel 112b are brought into contact along their edges, e.g., side edges 114. Then the front panel and back panel are bonded along the two side edges 114 by heat sealing, e.g., as described above for envelope 10. This provides the compostable envelope 110 with the pad 140 is bonded to the interior surface.

Rather than a single pad that is folded, two separate pads could be attached to the portions of the sheet 120 that will provide the front panel 112a and back panel 112b, respectively.

In addition, the sheet 120 and pad 140 could be folded along a line that will provide one of the side edges, and the heat sealing could be performed on the bottom edge and side edges. Alternatively, the front panel 112a and back panel 112b could be two separate sheets that are bonded along both side edges as well as the bottom edge.

The pad 140 could be any of the options noted above for pad 40, e.g., just a solid compostable panel 42, or a panel 42 surrounded by a compostable water-proof film. In the former case, the panel 42 is directly exposed to the contents of the interior of the envelope 110.

Figure 9:
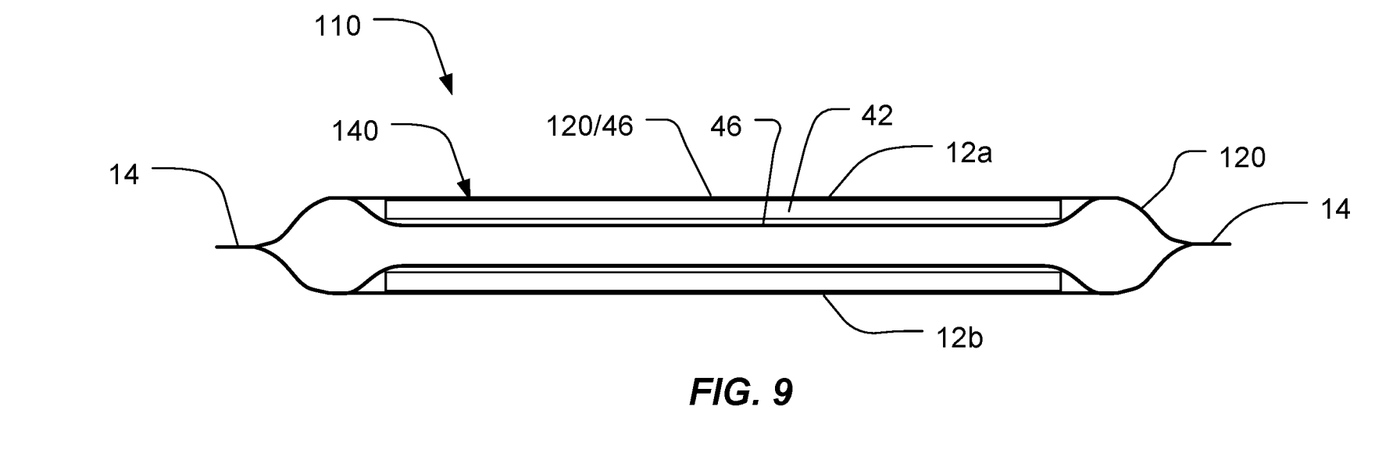
FIG. 9 is a schematic cross-sectional side view of an envelope in which a film of the envelope forms part of a pocket to enclose a panels.

In some implementations, the envelope itself could provide a portion of the pad 140. As one example, shown in FIG. 9, if the panel 42 is to be enclosed by a water-proof film, e.g., for thermally insulating applications, the sheet 120 could provide part of the film 46 that encloses the panel 42. For example, the panel 42 could be lowered onto the sheet 120 (as shown in FIGS. 8A-8B, and then another layer of compostable water-proof film 46 could be layered over the panel 42 and sheet 120. This layer could be bonded to the sheet 120 to trap the panel 42 in a pocket. Then the entire assembly can be folded, e.g., as shown in FIG. 7C. Thus, the panel 42 would be trapped between the compostable water-proof sheet 120 that provides the outer skin of the envelope 110, and another compostable water-proof layer that provides the inner skin of the envelope 110.

Figure 10:
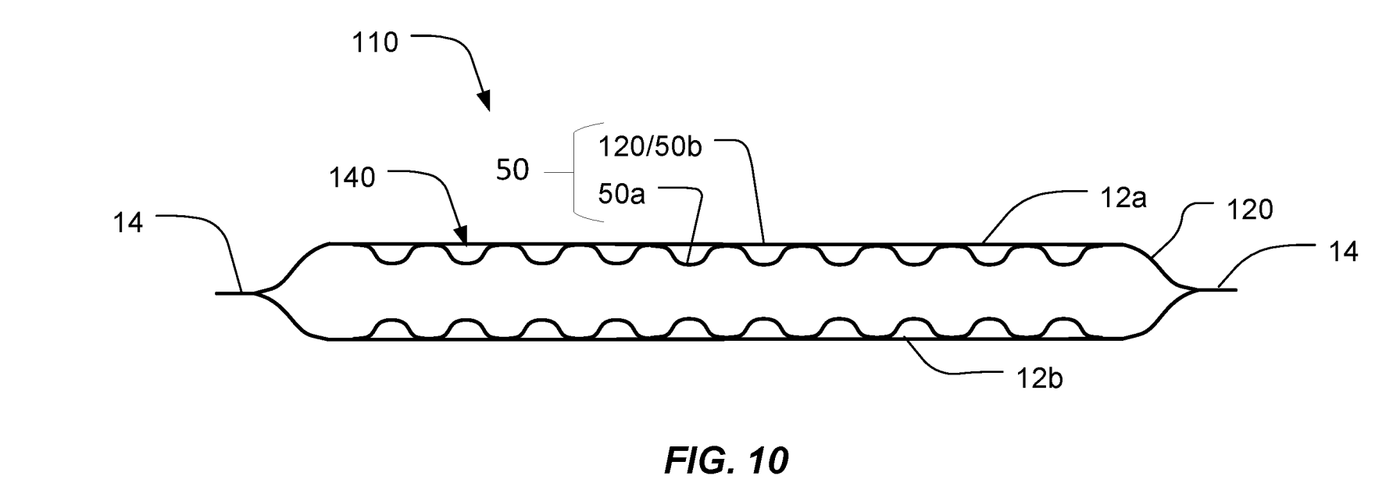
FIG. 10 is a schematic cross-sectional side view of an envelope in which a film of the envelope is one of plurality of layers bonded together in regions that trap air in pockets.

As another example, shown in FIG. 10, if the pad 140 include layers of compostable film that are bonded together and trap air in pockets, the sheet 120 could provide one of the layers 50 e.g., the lower layer 50b. To fabricate this envelope, upper layer 50a can be lowered onto and bonded to the sheet 120, e.g., as described for the embodiment of FIG. 5, to provide trapped air pockets. Then the entire assembly is folded such that the upper layer 50a will provides the inner skin of the envelope. The edges of the sheet 120 can then be bonded together. This provides the compostable envelope 110 with the pad 140 that includes trapped air pockets, and with the pad 140 integral with the envelope.

It should be understood that although various terms such as "top", "bottom", and "side" are used, these terms indicate relative positioning under the assumption that an opening to the envelope is at the top, and don't necessarily indicate an orientation relative to gravity; in use, or even during assembly, the envelope could be on its side or upside down relative to gravity.

A number of embodiments have been described. Nevertheless, it will be understood that various modifications may be made without departing from the spirit and scope of the invention. Accordingly, other embodiments are within the scope of the following claims.

What is claimed is:

1. An assembly for mailing or shipping an item, comprising:
   an envelope having (i) a front panel, (ii) a back panel, the front panel and the back panel joined along three edges and open along a fourth edge to provide an opening to an interior of the envelope to hold an object to be mailed or shipped, (iii) a foldable flap that extends from the front panel to close the opening, (iv) an adhesive on the foldable flap, and (v) a compostable liner covering the adhesive on the foldable flap, wherein the front panel, the back panel, and the foldable flap are formed of a compostable plastic film and the envelope is configured to be entirely compostable as-is by a recipient, and wherein the envelope consists of the compostable plastic film, the adhesive, and the compostable liner; and
   one or two compostable pads formed primarily of starch for stiffening, cushioning and/or thermal insulation sitting loose in the interior of the envelope and removable through the opening.

2. The assembly of claim 1, wherein the starch comprises at least one of a grain starch, a root starch or a vegetable starch.

3. The assembly of claim 1, wherein the one or two pads each comprise a plurality of stacked solid compostable panels, each panel of the plurality of formed primarily of starch.

4. The assembly of claim 1, wherein the assembly has a single compostable pad.

5. The assembly of claim 4, wherein the single compostable pad is folded to provide two parallel pad sections within the envelope.

6. The assembly of claim 5, wherein the pad is scored along the fold.

7. The assembly of claim 1, wherein the assembly has two separate compostable pads sitting in parallel in the interior of the envelope.

8. An envelope for mailing or shipping an item, comprising:
(i) a front panel, (ii) a back panel, at least one of the front panel and back panel including a first sheet and a second sheet that form a sealed pocket that traps air, and (iii) a solid compostable pad formed primarily of starch and that is enclosed by the sealed pocket and that is movable within the sealed pocket, the front panel and the back panel joined along three edges and open along a fourth edge to provide an opening to an interior of the envelope, wherein a foldable flap extends from the front panel to close the opening, and wherein the front panel, the back panel, and the foldable flap consist of a compostable plastic film, wherein the front panel and the back panel are more flexible than the solid compostable starch pad and wherein the envelope is configured to be entirely compostable as-is by a recipient.

9. The envelope of claim 8, wherein each of the front panel and the back panel including a pair of sheets that form a sealed pocket that traps air, and wherein the envelope includes a first solid compostable pad formed primarily of starch and that is enclosed by the sealed pocket of the front panel and a second solid compostable pad formed primarily of starch and that is enclosed by the sealed pocket of the back panel.

10. The envelope of claim 8, wherein the starch comprises at least one of a grain starch, a root starch or a vegetable starch.

11. The envelope of claim 8, wherein the compostable pad comprises a plurality of stacked solid compostable pad, each pad of the plurality of formed primarily of starch.

12. The envelope of claim 8, wherein the envelope consists of the compostable plastic film and one or two compostable pads.

* * * * *